Figure 1:
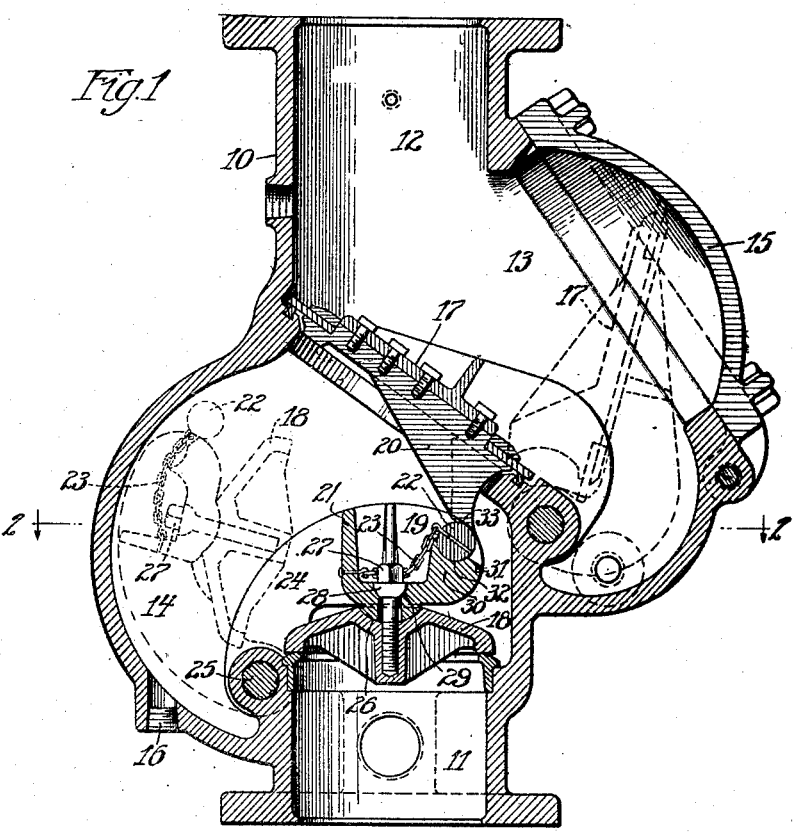

Nov. 10, 1925.                                                                    1,560,985
A. J. GROSS
DRY PIPE VALVE
Filed Aug. 5, 1921

Inventor
Allan J. Gross
By Otto N. Wernich atty.

Patented Nov. 10, 1925.

1,560,985

UNITED STATES PATENT OFFICE.

ALLAN J. GROSS, OF CHICAGO, ILLINOIS.

DRY-PIPE VALVE.

Application filed August 5, 1921. Serial No. 489,965.

*To all whom it may concern:*

Be it known that I, ALLAN J. GROSS, a citizen of the United States, residing at Chicago, in the county of Cook and State of Illinois, have invented a certain new and useful Improvement in Dry-Pipe Valves, of which the following is a full, clear, concise, and exact description, reference being had to the accompanying drawings, forming a part of this specification.

The invention relates to dry pipe valves and particularly to an arrangement whereby the valves within the casing are prevented from maintaining a closed condition after their initial operation or opening action, the structure, however, being capable of being reset so that the flow of water through the valve is prevented.

By employing a construction which insures the valves against being maintained in a closed condition, the formation of a water column above the valves within the casing is prevented, which insures the proper functioning of the structure after it has once been actuated to allow the water to pass through it.

It is an object of the invention to provide a construction capable of performing the above advantages in which one valve will cooperate with the other to maintain the latter against its seat when said valves are in closed or set relation to each other.

It is a further object of the invention to utilize the means above referred to to transmit the movement of one valve to the other during the opening action of the valves which occurs when the pressure exerted upon one of the valves is reduced sufficiently to allow the pressure exerted upon the other to overcome the pressure applied to the former.

In addition to the above referred to objects it is an object to employ an element which when the valves are in an open condition, assumes a position in which it prevents the coaction of the valves in the manner above described, upon their assuming a closed condition, thus preventing the valves from being maintained in this closed relation after their initial operation, said element being capable of being subsequently arranged to transmit the pressure and action of one valve to the other, in the manner hereinbefore described, or when said valves are reset.

It is a further object of the invention to provide a flexible connection between the valves, so that the proper seating of said valves will be accomplished when said valves assume a closed relation to the respective passages which they control.

In the particular embodiment of the invention illustrated in the drawings the valve casing is constructed to provide an air chamber, a neutral chamber, an inlet to the neutral chamber and an outlet from the air chamber. The inlet and outlet openings are arranged in substantial alignment with each other and a valve is arranged between the air chamber and the neutral chamber, and another valve is arranged between the neutral chamber and the inlet opening. These valves prevent the passage of the water through the valve casing when said valves are arranged in closed position, but are operable to allow the water to pass therethrough when the air pressure which holds them closed is released.

The construction of the valves and this pressure cooperate with each other to prevent the opening of the valve which controls the water inlet. A means is employed for transmitting this pressure in the air chamber from its valve to the valve which controls the water inlet passage. This means includes a member which during the closed position of the valves is interposed between said valves and transmits the pressure exerted upon one valve to the other and also transmits the movement of one valve to the other during the opening action of said valves. This member is so constructed that during the opening action of the valves it is actuated and caused to assume a position in which it is unable to perform the function of transmitting the pressure or movement of one valve to the other, until it is again manually set to perform these functions. These valves are independently operable after their initial actuation by the removal of said member from between them, which insures against said valves accidentally seating and permitting the production of what is known as water columning, which is caused by the accumulation of water above the air valve.

The particular means for transmitting the pressure exerted upon one valve to the other and preventing this action after the valves have been actuated, includes a member which may be interposed and removed from between the valves. This member is secured to one of said valves by a flexible connection such as a chain or wire which allows said member to move with respect to both valves so that it may move to an inoperative position, in which position it will be maintained until it is again manually set to again act to transmit the pressure exerted upon one valve to the other to hold said valve closed.

The invention will be explained in detail with reference to the accompanying drawings in which one embodiment of the invention is illustrated, it being understood, however, that the invention is not limited to the precise construction shown therein as changes and modifications may be resorted to without departing from the spirit of the invention as defined in the appended claims forming a part hereof.

Figure 2:
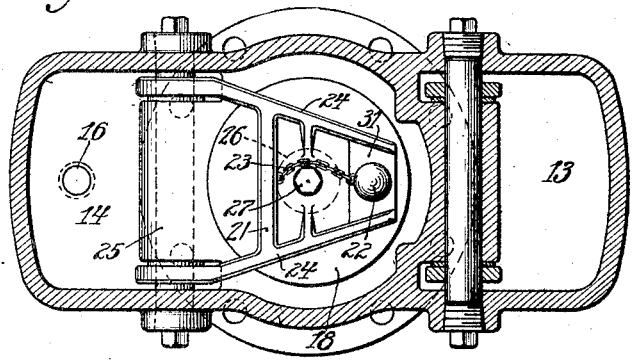

In the drawings Fig. 1 is a central section of a dry pipe valve having one embodiment of the invention applied thereto;

Fig. 2 is a section taken on line 2—2 of Fig. 1.

The structure shown includes the use of a valve casing 10 having the water inlet opening 11, and the water outlet 12. The casing is constructed to produce the air chamber 13 and the neutral chamber 14. A hand hold and cover 15 is provided and arranged adjacent the air chamber to permit of access thereto.

A valve 17 is arranged between the air chamber and the neutral chamber and the outlet opening 12, and this neutral chamber is provided with an alarm port 16. Another valve 18 controls the inlet passage 11 and this valve is arranged between the neutral chamber and the inlet.

The structure forming the basis of the application is generally designated 19, it being arranged between the valves 17 and 18 so that it may cooperate with the valves to transmit the air pressure which holds the valves closed, from one valve to the other when said valves are in their closed relation. This structure also transmits the motion of one valve to the other during the opening action of the valves so that they will be operated in synchronism with each other upon their initial opening action. Upon this action of the valves one of the elements entering into the means 19 assumes a position in which it cannot act to transmit the pressure from one valve to the other until said element is positively set to perform this function. This, therefore, prevents the accidental closing of the valves and the maintenance thereof in their closed relation after their initial actuation, which prevents water columning, as herein before described. The structure permits each valve to be independently operated, allowing the valve which controls the water inlet to be opened and maintained in this open condition by the water pressure which is thus permitted to be applied to the air valve to prevent its remaining closed, should it accidentally assume this last named position.

The specific construction illustrated for accomplishing this invention includes a downwardly extending arm 20 which extends from the lowermost face of the valve 17, the member 21 which is connected to the valve 18 and the member 22 which is designed to be arranged between the arm 20 and the member 21 to transmit the pressure of one valve to the other when said valves assume a closed relation to each other.

These parts are designed so that they may either assume the position thereof shown in full lines, in which the member 22 is arranged between the arm 20 and the member 21, or said parts 20, 21 and 22 and their associated elements may assume an open or changed position as illustrated in dotted lines in Fig. 1. By referring to the dotted line position in this figure the position of the member 22 will be particularly noted. When the parts are in this dotted line position, said member 22 has attained a changed position with relation to that shown by the full lines of this figure and therefore should the valves and member 21 be accidentally caused to assume the full line or closed position, with the member 22 in its changed position, no coaction of the parts results, and therefore any pressure exerted upon the valve 17 will not be transmitted to the valve 18.

The member 22 may be of any desired shape and may be secured to the member 21 by means of the chain 23, which allows this member 22 to readily assume its various positions. The member 21 is integral with the valve arms 24—24 and extends transversely from one arm to the other. These arms are pivoted at 25 within the valve casing 10. The lowermost face of the member 21 and the adjacent face of the valve 18 are constructed to cooperate and provide a ball and socket construction 26 which permits the valve to move with respect to the arms and insures the proper seating of said valve.

The valve 18 is carried by the member 21 through the medium of the bolt structure 27. This bolt has a rounded portion 28 which cooperates with a similarly shaped portion 29 provided in the portion 21. This also provides a ball and socket construction which allows the valve 18 to move with relation to the bolt so that the valve may be properly seated. The portion 21 is provided with an upwardly extending portion 30 having an inclined face 31 which is provided with a seat 32 for the member 22. The downwardly extending arm 20 of the valve 17 is provided with the recessed portion 33. This last named portion and the recessed portion 32 of the member 21 cooperate with each other to provide a seat for this member 22 when said member is arranged in the full line position shown in Fig. 1 in which position it is interposed between the arm 20 of the valve 17 and the portion 21 of the valve arms 24.

When the valves 17 and 18 and their associated mechanism are actuated by the release of the air pressure upon the valve 17 and the action of the water pressure against the valve 18, the parts assume the dotted line position shown in Fig. 1. This permits the ball or member 22 to fall away from between the parts 20 and 21, and therefore should either or both valves accidentally assume a closed relation, any pressure exerted upon the valve 17 cannot possibly be transmitted to the valve 18 as the relative position of this member 22 after the initial opening of the valves provides a space between the valves so that this pressure cannot be transmitted from one valve to the other. The structure of the valve 18 is such that it may swing with relation to said valve 17 when said valves are in a closed relation to each other and the member 22 has been displaced from between them. Therefore even though either or both of the valves 17 and 18 should accidentally become closed, the pressure of the water passing through the water inlet 11 is permitted to act upon said valves and force them open, preventing the water from forming a column above said valves to prevent the functioning thereof.

When it is desired to reset the parts to that position shown in full lines of Fig. 1 the valve 18 will be brought against its seat and the member 22 arranged in the recess 32, this recess being sufficiently deep to maintain said member 22 in this position until the arm 20 of the valve 17 is brought into engagement with the member 22, after which air pressure applied to the valve 17 will maintain said valves in a closed relation with the member 22 interposed between them.

Upon the reduction of the air pressure in the chamber 13 the water pressure exerted against the valve 18 will cause the valve 18 to be moved upon its pivot 25. This movement will be transmitted to the valve 17 through the medium of the member 22 which will cause both valves to open and assume the dotted line position shown in Fig. 1. When the valves are in the dotted line position the water may pass through the passages 11 and 12 and out into the sprinkler system.

From the foregoing description it is evident that a simple, cheap and effective arrangement is provided whereby the air pressure in the air chamber 13 may be exerted upon the valve 18, and upon the reduction of this air pressure in this chamber the water pressure below the valve 18 will actuate it and by virtue of the fact that the member 22 is interposed between the valves, this movement of the valve 18 is transmitted to the valve 17 and causes it to be opened. Upon this action of the valves the member 22 becomes unseated and will therefore prevent the pressure in the chamber 13 from being exerted upon the valve 18, which allows the valve 18 to be moved independently of the valve 17, thus insuring against the possibility of the formation of a water column above it to interfere with the proper operation after the initial operation of said internal valve structure.

Having thus described the invention, what I claim and desire to cover by Letters Patent is:

1. In a valve the combination of a casing, a pair of valves pivotally arranged within the casing, means cooperating with said valves when said valves are arranged in closed relation whereby one valve cooperates to maintain the other upon its seat, said means including an element secured to one of said valves adapted to be arranged upon a seat provided upon said valve to support said element and allow it to be engaged by the other valve, said element being movable upon the initial opening of said valves to destroy cooperation between said valves in the event of their return to seating position.

2. In a valve the combination of a casing, a pair of valves pivotally arranged within the casing, means cooperating with said valves when said valves are arranged in closed relation whereby one valve maintains the other upon its seat, said means being operable to destroy said cooperation upon the initial opening action of said valves, said means including a member which may be rested and thereby held in position upon one of said valves when the latter is set to thereby locate said member to permit it to be directly engaged by the other valve when the latter is moved to set position.

3. In a valve the combination of a casing, a pair of valves pivotally arranged in the casing, means cooperating with said valves when said valves are arranged in closed relation whereby one valve cooperates to maintain the other upon its seat, said means being operable to destroy cooperation of said valves after the initial opening action of said valves, said means consisting of a single element which is adapted to be rested upon and maintained in position upon one of the valves when the latter is set to permit of its engagement by the other valve when said last mentioned valve is brought to a set position.

4. In a valve of the character described, the combination of a valve casing, valves pivotally arranged therein, a member adapted to be arranged between said valves and adapted to cooperate with said valves to maintain one of said valves in closed relation, said member being operable to prevent said valves from maintaining a cooperative relation after their initial opening action, one of said valves having a portion providing a seat for said member in which said member may be seated and supported in a position for engagement by a means provided upon the other valve for engaging said member when arranged upon said seat and said seat being located in the path of movement of the means provided upon the second mentioned valve.

5. A valve having a casing, valves arranged therein, said valves having elements which cooperate to maintain one of said valves upon its seat, the element of one valve being spaced from the element of the other to permit the introduction of a member between them which member directly engages both valve elements and cooperates to transmit the action of one valve to the other when said valves are arranged in closed relation to each other, said member also acting to transmit the motion of one valve to the other upon the opening of one of said valves and destroying the cooperation of said valves after the initial opening of said valves, the element of one of said valves being provided with a seat in which said member may be arranged and supported in position when said valve is closed to permit said member to be engaged by the element of the other valve upon the setting action of said last mentioned valve.

In witness whereof, I hereunto subscribe my name this 5th day of July, A. D. 1921.

ALLAN J. GROSS.